(12) United States Patent
Huang et al.

(10) Patent No.: US 11,500,502 B2
(45) Date of Patent: Nov. 15, 2022

(54) TOUCH-CONTROLLING BASE PLATE AND DISPLAYING DEVICE

(71) Applicants: Chengdu BOE Optoelectronics Technology Co., Ltd., Sichuan (CN); BOE Technology Group Co., Ltd., Beijing (CN)

(72) Inventors: Chuan Huang, Beijing (CN); Xiaodan Wei, Beijing (CN); Yi Peng, Beijing (CN); Xiaoyu Xing, Beijing (CN); Chao Ye, Beijing (CN)

(73) Assignees: CHENGDU BOE OPTOELECTRONICS TECHNOLOGY CO., LTD., Sichuan (CN); BEIJING BOE TECHNOLOGY DEVELOPMENT CO., LTD., Beijing (CN)

( * ) Notice: Subject to any disclaimer, the term of this patent is extended or adjusted under 35 U.S.C. 154(b) by 0 days.

(21) Appl. No.: 17/329,359

(22) Filed: May 25, 2021

(65) Prior Publication Data
US 2022/0100317 A1 Mar. 31, 2022

(30) Foreign Application Priority Data
Sep. 30, 2020 (CN) .......................... 202011065472.7

(51) Int. Cl.
*G06F 3/044* (2006.01)
*G06F 3/041* (2006.01)
*G06F 3/047* (2006.01)

(52) U.S. Cl.
CPC ............ *G06F 3/0446* (2019.05); *G06F 3/047* (2013.01); *G06F 3/0412* (2013.01); *G06F 3/04164* (2019.05); *G06F 2203/04111* (2013.01)

(58) Field of Classification Search
None
See application file for complete search history.

(56) References Cited

U.S. PATENT DOCUMENTS

| | | | |
|---|---|---|---|
| 2011/0141051 A1* | 6/2011 | Ryu ...................... | G06F 3/0446 345/173 |
| 2014/0054156 A1* | 2/2014 | Chang ................ | H03K 17/9622 200/600 |
| 2020/0133435 A1* | 4/2020 | Liu ....................... | G06F 3/0443 |

* cited by examiner

*Primary Examiner* — Matthew Yeung
(74) *Attorney, Agent, or Firm* — WHDA, LLP

(57) ABSTRACT

A touch-controlling region of a touch-controlling base plate includes a touch-controlling layer; a non-touch-controlling region includes a plurality of lead wires and at least one touch-controlling unit; the touch-controlling layer includes a plurality of first electrically conductive units and a plurality of second electrically conductive units; the touch-controlling unit is located on at least a first side of the touch-controlling layer; the lead wires are connected to the touch-controlling unit, and are located on a same one side of the touch-controlling layer; and a plurality of lines of the first electrically conductive units that are arranged in the first channel direction are grouped into two groups, and at least one of the groups is connected to the lead wires via each line of the first electrically conductive units that are located at an edge of the first side of the touch-controlling layer.

15 Claims, 5 Drawing Sheets

TOUCH-CONTROLLING BASE PLATE AND DISPLAYING DEVICE

CROSS REFERENCE TO RELEVANT APPLICATIONS

The present disclosure claims the priority of the Chinese patent application filed on Sep. 30, 2020 before the Chinese Patent Office with the application number of 202011065472.7 and the title of "TOUCH-CONTROLLING BASE PLATE AND DISPLAYING DEVICE", which is incorporated herein in its entirety by reference.

TECHNICAL FIELD

The present disclosure relates to the technical field of displaying, and particularly relates to a touch-controlling base plate and a displaying device.

BACKGROUND

Touch-controlled screens, according to their different mechanisms of sensing the touched position of the operator, may be classified into multiple types such as resistor type, capacitor type, infrared type, ultrasonic type and optical type. Currently, portable electronic devices usually employ capacitor-type touch-controlled screens.

In the related art, a touch-controlled screen comprises a plurality of rows of electrically conductive blocks in a X channel direction and a plurality of columns of electrically conductive blocks in a Y channel direction, wherein the electrically conductive blocks in the X channel direction are arranged along the shorter sides parallel to the screen, and the electrically conductive blocks in the Y channel direction are arranged along the longer sides parallel to the screen.

SUMMARY

The embodiments of the present disclosure provide a touch-controlling base plate and a displaying device.

The embodiments of the present disclosure employ the following technical solutions:

In an aspect, there is provided a touch-controlling base plate, wherein the touch-controlling base plate comprises a touch-controlling region and a non-touch-controlling region that is connected to the touch-controlling region, the touch-controlling region comprises a touch-controlling layer, and the non-touch-controlling region comprises a plurality of lead wires and at least one touch-controlling unit;

the touch-controlling layer comprises a plurality of first electrically conductive units and a plurality of second electrically conductive units, and the plurality of first electrically conductive units and the plurality of second electrically conductive units are insulated from each other, and are arranged alternately in a first direction and a second direction respectively, wherein the first direction and the second direction intersect perpendicularly;

the touch-controlling unit is located on at least a first side of the touch-controlling layer, and the plurality of lead wires are connected to one instance of the touch-controlling unit, and are located on a same one side of the touch-controlling layer;

each line of the first electrically conductive units that are arranged in a first channel direction are connected to each other, and are connected to the touch-controlling unit, and each line of the second electrically conductive units that are arranged in a second channel direction are connected to each other, and are connected to the touch-controlling unit, wherein the first channel direction and the second channel direction intersect with and are not perpendicular to the first direction:

a plurality of lines of the first electrically conductive units that are arranged in the first channel direction are grouped into two groups, and at least one of the groups is connected to the lead wires via each line of the first electrically conductive units that are located at an edge of the first side of the touch-controlling layer; and/or, a plurality of lines of the second electrically conductive units that are arranged in the second channel direction are grouped into two groups, and at least one of the groups is connected to the lead wires via each line of the second electrically conductive units that are located at the edge of the first side of the touch-controlling layer.

Optionally, the non-touch-controlling region comprises two touch-controlling units, and the two touch-controlling units are individually located on the first side and a second side of the touch-controlling layer that face each other; and a plurality of lines of the first electrically conductive units that are arranged in the first channel direction are grouped into two groups, one of the groups is connected to the lead wires via each line of the first electrically conductive units that are located at the edge of the first side of the touch-controlling layer, and the other one of the groups is connected to the lead wires via each line of the first electrically conductive units that are located at an edge of the second side of the touch-controlling layer.

Optionally, the non-touch-controlling region comprises two touch-controlling units, and the two touch-controlling units are individually located on the first side and a second side of the touch-controlling layer that face each other; and a plurality of lines of the second electrically conductive units that are arranged in the second channel direction are grouped into two groups, one of the groups is connected to the lead wires via each line of the second electrically conductive units that are located at the edge of the first side of the touch-controlling layer, and the other one of the groups is connected to the lead wires via each line of the second electrically conductive units that are located at an edge of the second side of the touch-controlling layer.

Optionally, the touch-controlling unit comprises at least one touch-controlling electrode.

Optionally, the touch-controlling region further comprises a bridging layer, the bridging layer comprises a plurality of first bridging units and a plurality of second bridging units, and the first bridging units and the second bridging units intersect with and are insulated from each other.

Optionally, each line of the first electrically conductive units that are arranged in the first channel direction are connected to each other via the first bridging units, and each line of the second electrically conductive units that are arranged in the second channel direction are connected to each other via the second bridging units.

Optionally, the first bridging units, the first electrically conductive units and the second electrically conductive units are arranged in a same one layer.

Optionally, the first bridging units, the first electrically conductive units and the second electrically conductive units are fabricated by using a one-step patterning process.

Optionally, the touch-controlling region further comprises an insulating layer, the insulating layer comprises a plurality of via holes, and the insulating layer is located between the touch-controlling layer and the second bridging units.

Optionally, the second bridging units connect via the via holes two neighboring instances of the second electrically conductive units that are arranged in the second channel direction.

Optionally, the first electrically conductive units and the second electrically conductive units have a same shape.

Optionally, both of a material of the first electrically conductive units and a material of the second electrically conductive units are transparent electrically conductive materials.

In another aspect, there is provided a displaying device, wherein the displaying device comprises the touch-controlling base plate stated above.

Optionally, the displaying device further comprises a display panel; and the touch-controlling base plate is embedded into a periphery of a base plate of the display panel, or the touch-controlling base plate is embedded into a pixel unit of the display panel.

Optionally, the displaying device includes a liquid-crystal touch-controlled displaying device or an organic-light-emitting-diode touch-controlled displaying device.

The above description is merely a summary of the technical solutions of the present disclosure. In order to more clearly know the elements of the present disclosure to enable the implementation according to the contents of the description, and in order to make the above and other purposes, features and advantages of the present disclosure more apparent and understandable, the particular embodiments of the present disclosure are provided below.

BRIEF DESCRIPTION OF THE DRAWINGS

In order to more clearly illustrate the technical solutions of the embodiments of the present disclosure or the prior art, the figures that are required to describe the embodiments or the prior art will be briefly introduced below. Apparently, the figures that are described below are merely embodiments of the present disclosure, and a person skilled in the art can obtain other figures according to these figures without paying creative work.

DETAILED DESCRIPTION

Figure 1:
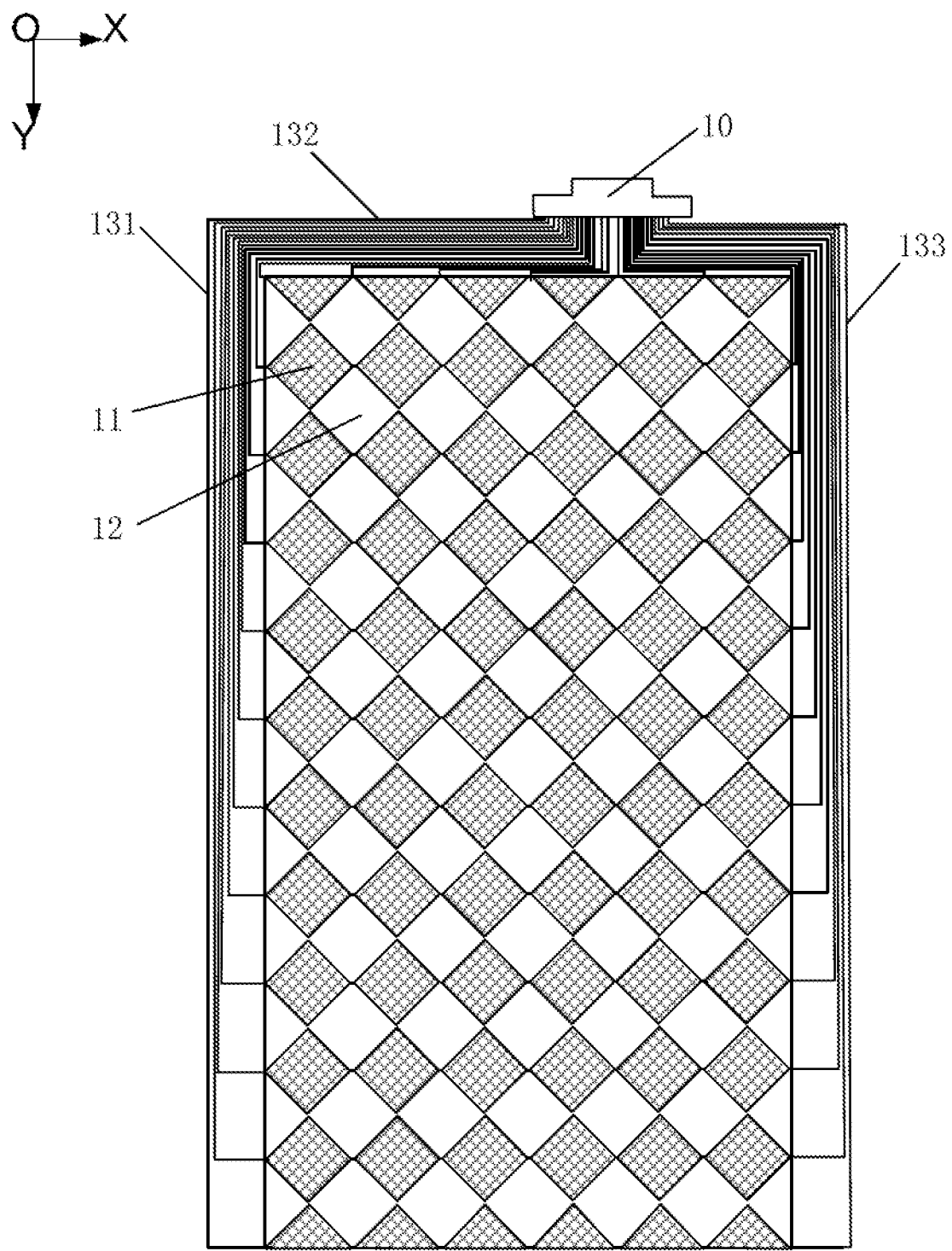
FIG. 1 is a schematic structural diagram of a touch-controlling base plate in the related art.

The technical solutions of the embodiments of the present disclosure will be clearly and completely described below with reference to the drawings of the embodiments of the present disclosure. Apparently, the described embodiments are merely certain embodiments of the present disclosure, rather than all of the embodiments. All of the other embodiments that a person skilled in the art obtains on the basis of the embodiments of the present disclosure without paying creative work fall within the protection scope of the present disclosure.

In the embodiments of the present disclosure, the meaning of "plurality of" is "two or more", and the meaning of "at least one" is "one or more", unless explicitly and clearly defined otherwise.

In the embodiments of the present disclosure, the terms that indicate orientation or position relations, such as "upper". "lower", "left" and "right", are based on the orientation or position relations shown in the drawings, and are merely for conveniently describing the present disclosure and simplifying the description, rather than indicating or implying that the device or element must have the specific orientation and be constructed and operated according to the specific orientation. Therefore, they should not be construed as a limitation on the present disclosure.

In the embodiments of the present disclosure, terms such as "first" and "second" are used to distinguish identical items or similar items that have substantially the same functions and effects, merely in order to clearly describe the technical solutions of the embodiments of the present disclosure, and should not be construed as indicating or implying the degrees of importance or implicitly indicating the quantity of the specified technical features.

Figure 2:
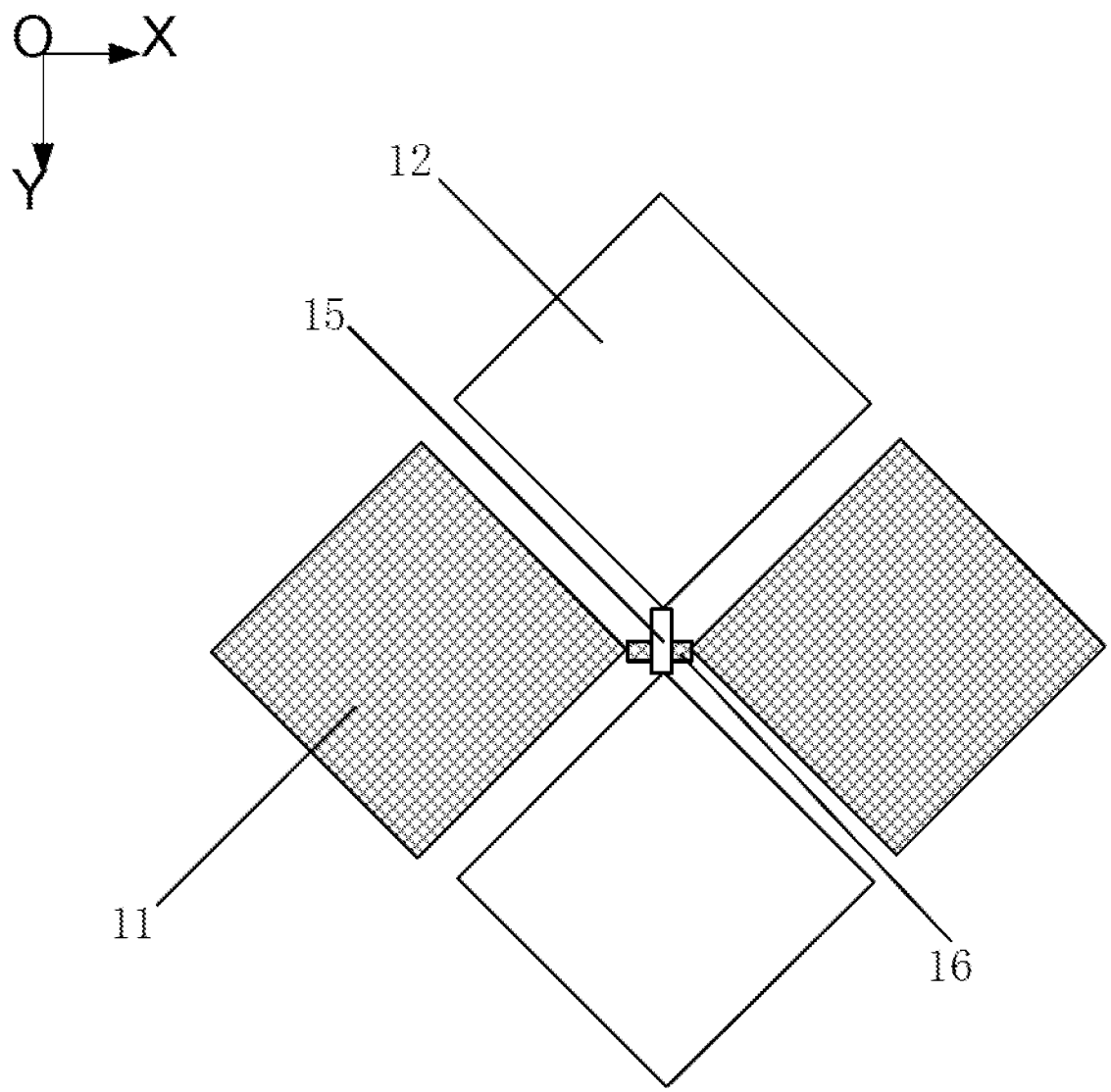
FIG. 2 is an enlarged schematic diagram of the first electrically conductive blocks and the second electrically conductive blocks in FIG. 1.

In the related art, referring to FIG. 1, a touch-controlled screen comprises first electrically conductive blocks 11 and second electrically conductive blocks 12, which are rhombic. Referring to FIG. 2, two neighboring first electrically conductive blocks 11 that are located in the same one row are connected by a lap-joining bridge 16, and two neighboring second electrically conductive blocks 12 that are located in the same one column are connected by a lap-joining bridge 15. Referring to FIGS. 1 and 2, all of the first electrically conductive blocks 11 in the same one row are connected to form a channel in the direction OX, and all of the second electrically conductive blocks 12 in the same one column are connected to form a channel in the direction OY. A plurality of left-side lead wires 131, a plurality of right-side lead wires 133 and a plurality of upper-side lead wires 132 of the touch-controlled screen connect the plurality of rows of first electrically conductive blocks 11 of the channel in the direction OX and a touch-controlling electrode 10. If on the upper side of the touch-controlled screen is merely provided one touch-controlling electrode, because the spacing between the lead wires is usually approximately 10 micrometers, the width of the area occupied by tens of lead wires is at least 2 millimeters. Even if on the upper side and the lower side of the touch-controlled screen is individually provided one touch-controlling electrode, the width of the lead-wire areas on the two sides of the touch-controlled screen can be reduced at most a half, and wide black boundary frames are still required to be provided on the left side and the right side of the touch-controlled screen, to block the lead wires. However the black boundary frames reduce the screen-to-body ratio, which cannot satisfy the demands on extra-narrow boundary frames, wastes resource, and increases the cost.

In view of that, an embodiment of the present disclosure provides a touch-controlling base plate, wherein the touch-controlling base plate comprises a touch-controlling region and a non-touch-controlling region that is connected to the touch-controlling region; the touch-controlling region comprises a touch-controlling layer; and the non-touch-controlling region comprises a plurality of lead wires and at least one touch-controlling unit.

Here, the touch-controlling region is used to realize the touch controlling, and the non-touch-controlling region is used to arrange the lead wires, the touch-controlling electric circuits, the touch-controlling chips and so on. By applying the touch-controlling base plate to a displaying device, a touch-controlled displaying device may be formed, wherein the touch-controlling region may correspond to a displaying region (Active Area, region AA) of the displaying device, and the non-touch-controlling region may correspond to a non-displaying region of the displaying device.

Figure 3:
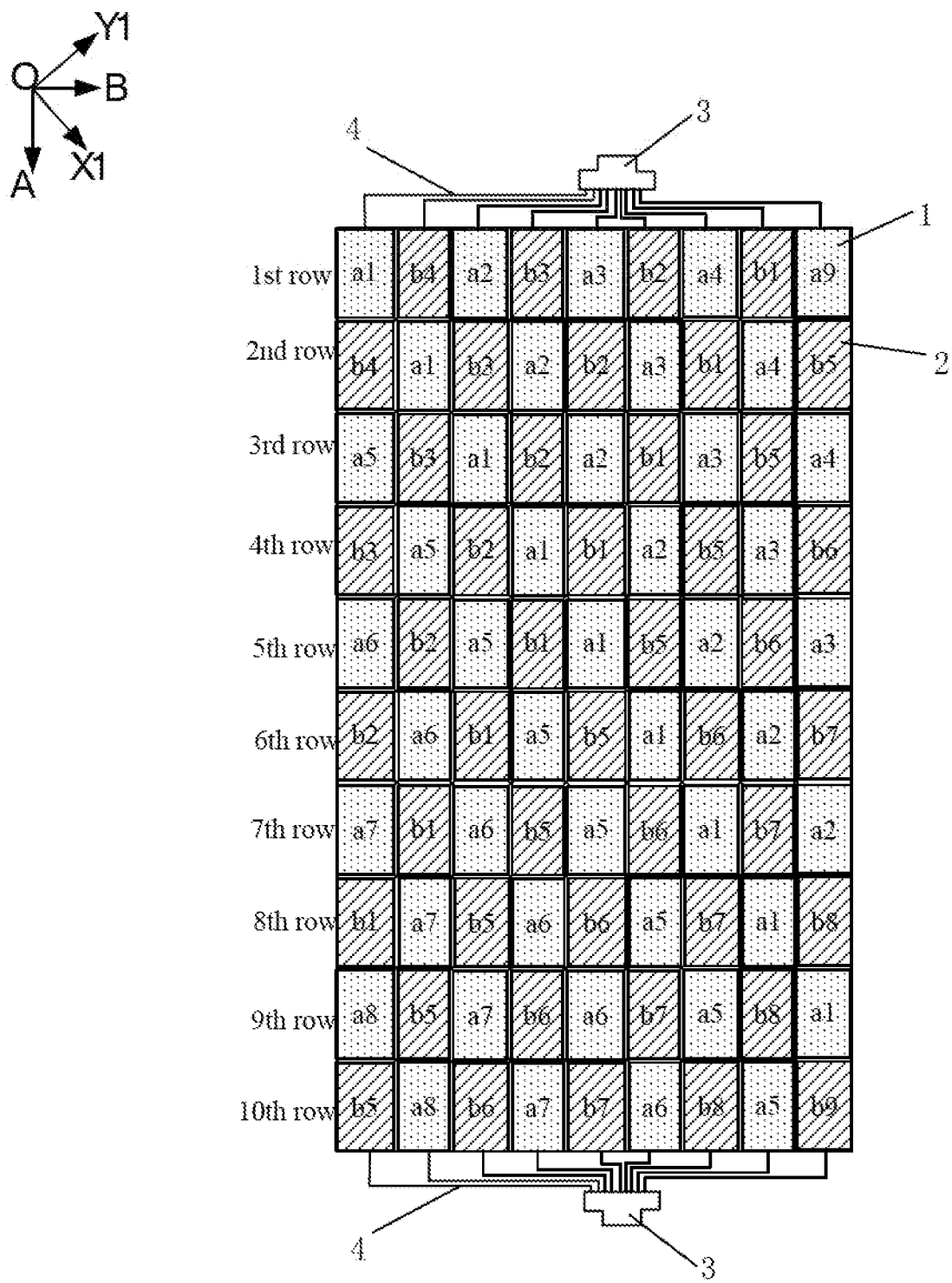
FIG. 3 is a schematic structural diagram of the touch-controlling base plate according to an embodiment of the present disclosure.

Referring to FIG. 3, the touch-controlling layer comprises a plurality of first electrically conductive units 1 and a plurality of second electrically conductive units 2, and the first electrically conductive units 1 and the second electrically conductive units 2 are insulated from each other, and are arranged alternately in a first direction (as the direction OB shown in FIG. 3) and a second direction (as the direction OA shown in FIG. 3) respectively, wherein the first direction and the second direction intersect perpendicularly.

The touch-controlling base plate is usually configured to be rectangular, and, therefore, the first direction may be the direction OB shown in FIG. 3 (i.e., the direction of the shorter sides of the touch-controlling base plate); in this case, the second direction may be the direction OA shown in FIG. 3 (i.e., the direction of the longer sides of the touch-controlling base plate). Alternatively, the first direction may also be the direction OA shown in FIG. 3 (i.e., the direction of the longer sides of the touch-controlling base plate); in this case, the second direction may be the direction OB shown in FIG. 3 (i.e., the direction of the shorter sides of the touch-controlling base plate), which is not limited herein. FIG. 3 illustrates by taking the case in which the first direction is the direction OB and the second direction is the direction OA as an example.

The quantities, the shapes and the materials of the first electrically conductive units and the second electrically conductive units are not limited herein. FIG. 3 illustrates by taking the case in which the first electrically conductive units and the second electrically conductive units are rectangular as an example.

In the touch-controlling base plate, the touch-controlling unit is located on at least a first side of the touch-controlling layer; and the lead wires are connected to the touch-controlling unit, and are located on a same one side of the touch-controlling layer.

The particular position of the first side of the touch-controlling layer is not limited herein, and it may be the upper side, the lower side, the left side or the right side of the touch-controlling layer, which may be particularly determined according to practical demands.

That the touch-controlling unit is located on at least a first side of the touch-controlling layer refers to that the touch-controlling units may be located on merely the first side of the touch-controlling layer, and may also be located on other sides than the first side. FIG. 3 illustrates by taking the case as an example in which the non-touch-controlling region comprises two touch-controlling units 3 and the two touch-controlling units 3 are individually located on a first side (the upper side of the touch-controlling layer shown in FIG. 3) and a second side (the lower side of the touch-controlling layer shown in FIG. 3) of the touch-controlling layer that face each other.

Referring to FIG. 3, each line of the first electrically conductive units 1 that are arranged in a first channel direction (the direction OX1 in FIG. 3) are connected to each other, and are connected to the touch-controlling unit 4, and each line of the second electrically conductive units 2 that are arranged in a second channel direction (the direction OY1 in FIG. 3) are connected to each other, and are connected to the touch-controlling unit 4, wherein the first channel direction (the direction OX1 in FIG. 3) and the second channel direction (the direction OY1 in FIG. 3) intersect with and are not perpendicular to the first direction (the direction OB in FIG. 3).

A plurality of lines of the first electrically conductive units that are arranged in the first channel direction are grouped into two groups, and at least one of the groups is connected to the lead wires via each line of the first electrically conductive units that are located at an edge of the first side of the touch-controlling layer.

Referring to FIG. 3, the one line of first electrically conductive units 1 that are in the direction OX1 and are marked with a1 is taken as an example for the description. In the line, all of the first electrically conductive units are connected to each other, and are connected to the lead wires 4 located on the upper side of the touch-controlling layer via a first electrically conductive unit located at the edge of the first side of the touch-controlling layer (i.e., the first electrically conductive unit located at the 1st row and the 1st column in FIG. 3), and the lead wires 4 are connected to the touch-controlling unit 3, which realizes the connection between the line of first electrically conductive units and the touch-controlling unit. In FIG. 3, the touch-controlling layer comprises 10 rows and 9 columns of the first electrically conductive units and the second electrically conductive units that are arranged alternately, wherein the columns are, from left to right in the direction OB, sequentially the 1st column, the 2nd column, the 3rd column, . . . and the 9th column, and the rows are, from top to bottom in the direction OA, sequentially the 1st row, the 2nd row, the 3rd row, . . . , and the 10th row.

The plurality of lines of the first electrically conductive units that are arranged in the first channel direction are grouped into two groups, and the particular mode of grouping is not limited herein. As an example, in FIG. 3, in the plurality of lines of first electrically conductive units that are arranged in the first channel direction (OX1), all of the first electrically conductive units located in the same one line are marked with the same one letter. For example, all of the first electrically conductive units that are marked with a1 are in the same one line, and all of the first electrically conductive units that are marked with a2 are in the same one line. FIG. 3 illustrates by taking the case in which the touch-controlling layer comprises 9 lines of first electrically conductive units that are arranged in the first channel direction (OX1) as an example. In the 9 lines of first electrically conductive units, the 5 lines of first electrically conductive units are individually marked with a1, a2, a3, a4 and a9 may be grouped into a first group, and the 4 lines of first electrically conductive units that are individually marked with a5, a6, a7 and a8 may be grouped into a second group. The first group is connected to the lead wires via each line of the first electrically conductive units that are located at the edge of the first side of the touch-controlling layer. Referring to FIG. 3, the second group may also be connected to the lead wires via each line of the first electrically conductive units that are located at the edge of the second side of the touch-controlling layer. Alternatively, the touch-controlling base plate is provided with connecting lead wires on the sides of the touch-controlling layer that are not provided with the touch-controlling unit (for example, the left side and the right side of the touch-controlling layer in FIG. 3), and the connecting lead wires are connected to the lead wires, whereby the second group may also be connected via the connecting lead wires to the lead wires, and in turn to the touch-controlling unit.

Additionally or alternatively, a plurality of lines of the second electrically conductive units that are arranged in the second channel direction are grouped into two groups, and at least one of the groups is connected to the lead wires via each line of the second electrically conductive units that are located at the edge of the first side of the touch-controlling layer.

Referring to FIG. 3, the one line of second electrically conductive units 2 that are in the direction OY1 and are marked with b2 is taken as an example for the description. In the line, all of the second electrically conductive units are connected to each other, and are connected to the lead wires 4 located on the upper side of the touch-controlling layer via a second electrically conductive unit located at the edge of the first side of the touch-controlling layer (i.e., the second electrically conductive unit located at the 1st row and the 6th column in FIG. 3), and the lead wires 4 are connected to the touch-controlling unit 3, which realizes the connection between the line of second electrically conductive units and the touch-controlling unit.

The plurality of lines of the second electrically conductive units that are arranged in the second channel direction are grouped into two groups, and the particular mode of grouping is not limited herein. As an example, in FIG. 3, in the plurality of lines of second electrically conductive units that are arranged in the second channel direction (OY1), all of the second electrically conductive units located in the same one line are marked with the same one letter. For example, all of the second electrically conductive units that are marked with b1 are in the same one line, and all of the second electrically conductive units that are marked with b2 are in the same one line. FIG. 3 illustrates by taking the case in which the touch-controlling layer comprises 9 lines of second electrically conductive units that are arranged in the second channel direction (OY1) as an example. In the 9 lines of second electrically conductive units, the 4 lines of second electrically conductive units that are individually marked with b1, b2, b3 and b4 may be grouped into a first group, and the 5 lines of second electrically conductive units that are individually marked with b5, b6, b7, b8 and b9 may be grouped into a second group. The first group is connected to the lead wires via each line of the second electrically conductive units that are located at the edge of the first side of the touch-controlling layer. Referring to FIG. 3, the second group may also be connected to the lead wires via each line of the second electrically conductive units that are located at the edge of the second side of the touch-controlling layer. Alternatively, the touch-controlling base plate is provided with connecting lead wires on the sides of the touch-controlling layer that am not provided with the touch-controlling unit (for example, the left side and the right side of the touch-controlling layer in FIG. 3), and the connecting lead wires are connected to the lead wires, whereby the second group may also be connected via the connecting lead wires to the lead wires, and in turn to the touch-controlling unit.

The included angle between the first channel direction and the first direction is not limited herein. As an example, the included angle may be 40°, 45°, 50°, 60° and so on. The included angle between the second channel direction and the first direction is not limited herein, as long as it is satisfied that the first channel direction and the second channel direction intersect with and are not perpendicular to the first direction. It should be noted that, if the first direction and the second direction intersect perpendicularly, and the first channel direction and the second channel direction intersect with and are not perpendicular to the first direction, then the first channel direction and the second channel direction intersect with and are not perpendicular to the second direction. FIG. 3 illustrates by taking the case as an example in which the direction OB is the first direction, the direction OA is the second direction, the direction OX1 is the first channel direction and the direction OY1 is the second channel direction.

The touch-controlling base plate has the following three cases.

In the first case, in the touch-controlling base plate, a plurality of lines of the first electrically conductive units that are arranged in the first channel direction are grouped into two groups, and at least one of the groups is connected to the lead wires via each line of the first electrically conductive units that are located at an edge of the first side of the touch-controlling layer.

In the touch-controlling base plate, among the plurality of lines of first electrically conductive units that are arranged in the first channel direction, at least one of the groups is connected to the lead wires via each line of the first electrically conductive units that are located at the edge of the first side of the touch-controlling layer. Therefore, the plurality of lines of first electrically conductive units that are arranged in the first channel direction of this group may be connected to the touch-controlling unit by the lead wires. Moreover, because the lead wires and the touch-controlling unit are located on the same one side of the touch-controlling layer, it is not required to provide extra lead wires on the sides of the touch-controlling base plate that are not provided with the touch-controlling unit to connect this group of first electrically conductive units and the touch-controlling unit, which can reduce the width of the sides of the touch-controlling base plate that are not provided with the touch-controlling unit, and in turn greatly reduce the size of the black boundary frames, thereby increasing the screen-to-body ratio, to satisfy the demands on extra-narrow boundary frames.

In the second case, in the touch-controlling base plate, a plurality of lines of the second electrically conductive units that are arranged in the second channel direction are grouped into two groups, and at least one of the groups is connected to the lead wires via each line of the second electrically conductive units that are located at the edge of the first side of the touch-controlling layer.

In the touch-controlling base plate, among the plurality of lines of second electrically conductive units that are arranged in the second channel direction, at least one of the groups is connected to the lead wires via each line of the second electrically conductive units that are located at the edge of the first side of the touch-controlling layer. Therefore, the plurality of lines of second electrically conductive units that are arranged in the second channel direction of this group may be connected to the touch-controlling unit by the lead wires. Moreover, because the lead wires and the touch-controlling unit are located on the same one side of the touch-controlling layer, it is not required to provide extra lead wires on the sides of the touch-controlling base plate that are not provided with the touch-controlling unit to connect this group of second electrically conductive units and the touch-controlling unit, which can reduce the width of the sides of the touch-controlling base plate that are not provided with the touch-controlling unit, and in turn greatly reduce the size of the black boundary frames, thereby increasing the screen-to-body ratio, to satisfy the demands on extra-narrow boundary frames.

In the third case, in the touch-controlling base plate, a plurality of lines of the first electrically conductive units that are arranged in the first channel direction are grouped into two groups, and at least one of the groups is connected to the lead wires via each line of the first electrically conductive units that are located at an edge of the first side of the touch-controlling layer; and a plurality of lines of the second electrically conductive units that are arranged in the second channel direction are grouped into two groups, and at least one of the groups is connected to the lead wires via each line of the second electrically conductive units that are located at the edge of the first side of the touch-controlling layer.

In the touch-controlling base plate, among the plurality of lines of first electrically conductive units that are arranged in the first channel direction, at least one of the groups is connected to the lead wires via each line of the first electrically conductive units that are located at the edge of the first side of the touch-controlling layer. Therefore, the plurality of lines of first electrically conductive units that are arranged in the first channel direction of this group may be connected to the touch-controlling unit by the lead wires. Moreover, because the lead wires and the touch-controlling unit are located on the same one side of the touch-controlling layer, it is not required to provide extra lead wires on the sides of the touch-controlling base plate that are not provided with the touch-controlling unit to connect this group of first electrically conductive units and the touch-controlling unit. Moreover, among the plurality of lines of second electrically conductive units that are arranged in the second channel direction, at least one of the groups is connected to the lead wires via each line of the second electrically conductive units that are located at the edge of the first side of the touch-controlling layer. Therefore, the plurality of lines of second electrically conductive units that are arranged in the second channel direction of this group may be connected to the touch-controlling unit by the lead wires. Moreover, because the lead wires and the touch-controlling unit are located on the same one side of the touch-controlling layer, it is not required to provide extra lead wires on the sides of the touch-controlling base plate that are not provided with the touch-controlling unit to connect this group of second electrically conductive units and the touch-controlling unit. That can greatly reduce the width of the sides of the touch-controlling base plate that are not provided with the touch-controlling unit, and in turn greatly reduce the size of the black boundary frames, thereby increasing the screen-to-body ratio, to satisfy the demands on extra-narrow boundary frames.

In order to further reduce the width of the sides of the touch-controlling base plate that are not provided with the touch-controlling unit, optionally, referring to FIG. 3, the non-touch-controlling region comprises two touch-controlling units 3, and the two touch-controlling units 3 are individually located on the first side (the upper side of the touch-controlling layer in FIG. 3) and the second side (the lower side of the touch-controlling layer in FIG. 3) of the touch-controlling layer that face each other.

A plurality of lines of the first electrically conductive units that are arranged in the first channel direction are grouped into two groups, one of the groups is connected to the lead wires via each line of the first electrically conductive units that are located at the edge of the first side of the touch-controlling layer, and the other one of the groups is connected to the lead wires via each line of the first electrically conductive units that are located at an edge of the second side of the touch-controlling layer.

Referring to FIG. 3, in the plurality of lines of first electrically conductive units that are arranged in the first channel direction (OX1), all of the first electrically conductive units located in the same one line are marked with the same one letter. For example, all of the first electrically conductive units that are marked with a1 are in the same one line, and all of the first electrically conductive units that are marked with a2 are in the same one line. FIG. 3 illustrates by taking the case in which the touch-controlling layer comprises 9 lines of first electrically conductive units that are arranged in the first channel direction (OX1) as an example. In the 9 lines of first electrically conductive units, the 5 lines of first electrically conductive units are individually marked with a1, a2, a3, a4 and a9 may be grouped into a first group, and the 4 lines of first electrically conductive units that are individually marked with a5, a6, a7 and a8 may be grouped into a second group. The first group is connected to the lead wires 4 (located on the upper side of the touch-controlling layer) via each line of the first electrically conductive units located at the edge of the first side of the touch-controlling layer, and the second group is connected to the lead wires 4 (located on the lower side of the touch-controlling layer) via each line of the first electrically conductive units located at the edge of the second side of the touch-controlling layer. Accordingly, all of the first electrically conductive units comprised in the touch-controlling layer are connected to the touch-controlling unit via the lead wires on the first side or the second side (the upper side or the lower side shown in FIG. 3) of the touch-controlling layer, and therefore it is not required to provide extra lead wires on the other sides (the left side and the right side shown in FIG. 3) of the touch-controlling layer to connect each line of the first electrically conductive units and the touch-controlling unit, which can greatly reduce the width of the sides of the touch-controlling base plate that are not provided with the touch-controlling unit, and in turn greatly reduce the size of the black boundary frames, thereby further increasing the screen-to-body ratio, to satisfy the demands on extra-narrow boundary frames.

In order to further reduce the width of the sides of the touch-controlling base plate that are not provided with the touch-controlling unit, optionally, the non-touch-controlling region comprises two touch-controlling units, and the two touch-controlling units are individually located on the first side and a second side of the touch-controlling layer that face each other.

A plurality of lines of the second electrically conductive units that are arranged in the second channel direction are grouped into two groups, one of the groups is connected to the lead wires via each line of the second electrically conductive units that are located at the edge of the first side of the touch-controlling layer, and the other one of the groups is connected to the lead wires via each line of the second electrically conductive units that are located at an edge of the second side of the touch-controlling layer.

Referring to FIG. 3, in the plurality of lines of second electrically conductive units that are arranged in the second channel direction (OY1), all of the second electrically conductive units located in the same one line are marked with the same one letter. For example, all of the second electrically conductive units that are marked with b1 are in the same one line, and all of the second electrically conductive units that are marked with b2 are in the same one line. FIG. 3 illustrates by taking the case in which the touch-controlling layer comprises 9 lines of second electrically conductive units that are arranged in the second channel direction (OY1) as an example. In the 9 lines of second electrically conductive units, the 4 lines of second electrically conductive units that are individually marked with b1, b2, b3 and b4 may be grouped into a first group, and the 5 lines of second electrically conductive units that are individually marked with b5, b6, b7, b8 and b9 may be grouped into a second group. The first group is connected to the lead wires via each line of the second electrically conductive units that are located at the edge of the first side of the touch-controlling layer. The second group is connected to the lead wires via each line of the second electrically conductive units that are located at the edge of the second side of the touch-controlling layer. Accordingly, all of the second electrically conductive units comprised in the touch-controlling layer are connected to the touch-controlling unit via the lead wires on the first side or the second side (the upper side or the lower side shown in FIG. 3) of the touch-controlling layer, and therefore it is not required to provide extra lead wires on the other sides (the left side and the right side shown in FIG. 3) of the touch-controlling layer to connect each line of the second electrically conductive units and the touch-controlling unit, which can greatly reduce the width of the sides of the touch-controlling base plate that are not provided with the touch-controlling unit, and in turn greatly reduce the size of the black boundary frames, thereby further increasing the screen-to-body ratio, to satisfy the demands on extra-narrow boundary frames.

In order to further reduce the width of the sides of the touch-controlling base plate that are not provided with the touch-controlling unit, optionally, the non-touch-controlling region comprises two touch-controlling units, and the two touch-controlling units are individually located on the first side and a second side of the touch-controlling layer that face each other.

A plurality of lines of the first electrically conductive units that are arranged in the first channel direction are grouped into two groups, one of the groups is connected to the lead wires via each line of the first electrically conductive units that are located at the edge of the first side of the touch-controlling layer, and the other one of the groups is connected to the lead wires via each line of the first electrically conductive units that are located at an edge of the second side of the touch-controlling layer.

A plurality of lines of the second electrically conductive units that are arranged in the second channel direction are grouped into two groups, one of the groups is connected to the lead wires via each line of the second electrically conductive units that are located at the edge of the first side of the touch-controlling layer, and the other one of the groups is connected to the lead wires via each line of the second electrically conductive units that are located at an edge of the second side of the touch-controlling layer.

Accordingly, all of the first electrically conductive units and all of the second electrically conductive units comprised in the touch-controlling layer are connected to the touch-controlling unit via the lead wires on the first side or the second side of the touch-controlling layer, and therefore it is not required to provide extra lead wires on the other sides of the touch-controlling layer, which can greatly reduce the width of the sides of the touch-controlling base plate that are not provided with the touch-controlling unit, and in turn greatly reduce the size of the black boundary frames, thereby further increasing the screen-to-body ratio, to satisfy the demands on extra-narrow boundary frames.

Optionally, the touch-controlling unit comprises at least one touch-controlling electrode. The touch-controlling unit may comprise merely one touch-controlling electrode, and may also comprise a plurality of touch-controlling electrodes, which may be particularly selected according to the size of the touch-controlling base plate. FIG. 3 illustrates by taking the case as an example in which each of the touch-controlling units comprises one touch-controlling electrode.

Figure 4:
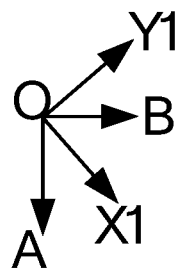
FIG. 4 is an enlarged schematic diagram of the first electrically conductive units and the second electrically conductive units in FIG. 3.
Figure 4:
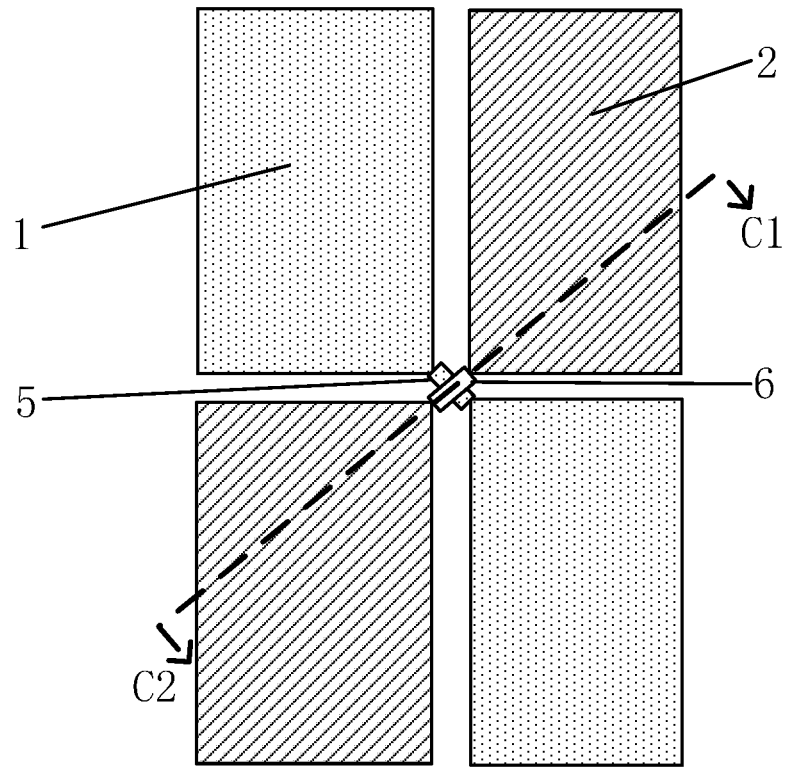

Optionally, in order to reduce the difficulty in the designing and the fabrication, the touch-controlling region further comprises a bridging layer, and the bridging layer comprises a plurality of first bridging units and a plurality of second bridging units. Referring to FIG. 4, the first bridging units 5 and the second bridging units 6 intersect with and are insulated from each other.

Optionally, each line of the first electrically conductive units that are arranged in the first channel direction are connected to each other via the first bridging units, and each line of the second electrically conductive units that are arranged in the second channel direction are connected to each other via the second bridging units.

The shapes and the materials of the first bridging units and the second bridging units are not particularly limited herein. As an example, the materials of the first bridging units and the second bridging units may include a metal or a metal oxide and so on.

In order to reduce the time quantity of patterning and simplify the fabrication process, thereby reducing the fabrication cost, optionally, the first bridging units, the first electrically conductive units and the second electrically conductive units are arranged in a same one layer. In this case, the first bridging units and the first electrically conductive units may be directly connected.

The above-described arrangement in a same one layer refers to that they are fabricated by using a one-step patterning process. The one-step patterning process refers to a process in which the required layer structure is formed by film formation and lithography in one step. The one-step patterning process includes the processes of film formation, exposure, development, etching, stripping and so on.

Figure 5:
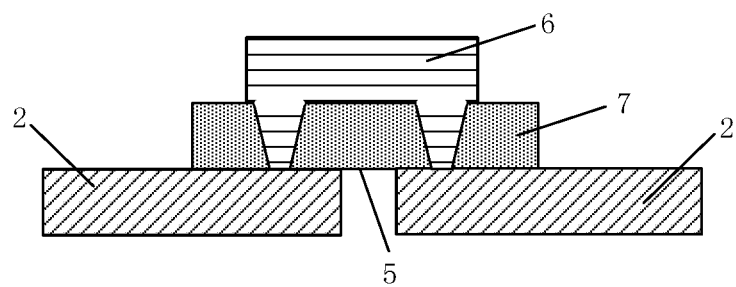
FIG. 5 is a cross-sectional view along the C1C2 in FIG. 4.
Figure 6:
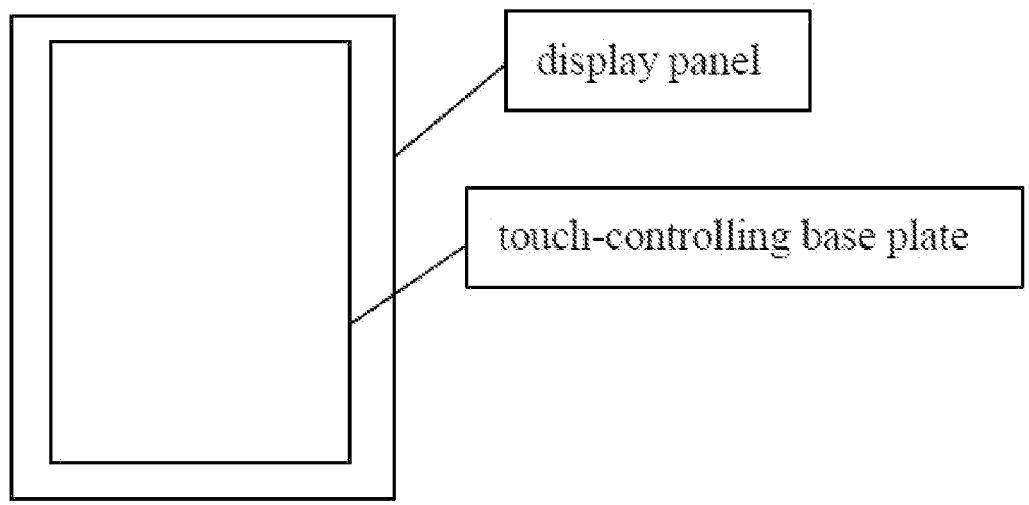
FIG. 6 is a schematic structural diagram of the displaying device.

In order to ensure that the first bridging units and the second bridging units are insulated from each other, optionally, referring to FIGS. 4 and 5, the touch-controlling region further comprises an insulating layer 7, the insulating layer 7 comprises a plurality of via holes (not shown in FIG. 5), and the insulating layer 7 is located between the touch-controlling layer (comprising the second electrically conductive units 2 in FIG. 5) and the second bridging units 6.

Referring to FIG. 5, the second bridging units 6 connect via the via holes two neighboring second electrically conductive units 2 that are arranged in the second channel direction, to in turn connect together each line of the second electrically conductive units that are arranged in the second channel direction.

Optionally, in order to reduce the difficulty in the designing and the fabrication, the first electrically conductive units and the second electrically conductive units have a same shape. As an example, referring to FIG. 3, all of the first electrically conductive units 1 and the second electrically conductive units 2 may be rectangular.

Optionally, both of a material of the first electrically conductive units and a material of the second electrically conductive units are transparent electrically conductive materials. As an example, the transparent electrically conductive materials may include Indium Tin Oxide (ITO).

An embodiment of the present disclosure further provides a displaying device, wherein the displaying device comprises the touch-controlling base plate stated above.

The displaying device may further comprise a display panel. The touch-controlling base plate may be attached externally to the display panel, and may also be embedded into the display panel. If the touch-controlling base plate is embedded into the periphery of the base plate of the display panel, such a structure is a Touch On Cell structure. If the touch-controlling base plate is embedded into a pixel unit of the display panel, such a structure is a Touch In Cell structure.

The displaying device may be a rigid displaying device, and may also be a flexible displaying device (i.e., bendable and foldable). Its type may be liquid-crystal touch-controlled displaying devices such as Twisted Nematic (TN) type, Vertical Alignment (VA) type, In-Plane Switching (IPS) type or Advanced Super Dimension Switch (ADS) type, and may also be Organic Light Emitting Diode (OLED) touch-controlled displaying devices and any products or components having a displaying function that comprise the touch-controlled displaying devices, such as a television set, a digital camera, a mobile phone and a tablet personal computer.

The above are merely particular embodiments of the present disclosure, and the protection scope of the present disclosure is not limited thereto. All of the variations or substitutions that a person skilled in the art can easily envisage within the technical scope disclosed by the present disclosure should fall within the protection scope of the present disclosure. Therefore, the protection scope of the present disclosure should be subject to the protection scope of the claims.

The invention claimed is:

1. A touch-controlling, base plate, wherein the touch-controlling base plate comprises a touch-controlling region and a non-touch-controlling region that is connected to the touch-controlling region, the touch-controlling region comprises a touch-controlling layer, and the non-touch-controlling region comprises a plurality of lead wires and at least one touch-controlling unit;

the touch-controlling layer comprises a plurality of first electrically conductive units and a plurality of second electrically conductive units, and the plurality of first electrically conductive units and the plurality of second electrically conductive units are insulated from each other, and are arranged alternately in a first direction and a second direction respectively, wherein the first direction and the second direction intersect perpendicularly;

the touch-controlling unit is located on at least a first side of the touch-controlling layer, and the plurality of lead wires are connected to one instance of the touch-controlling unit, and are located on a same one side of the touch-controlling layer;

each line of the first electrically conductive units that are arranged in a first channel direction are connected to each other, and are connected to the touch-controlling unit, and each line of the second electrically conductive units that are arranged in a second channel direction are connected to each other, and are connected to the touch-controlling unit, wherein the first channel direction and the second channel direction intersect with and are not perpendicular to the first direction;

a plurality of lines of the first electrically conductive units that are arranged in the first channel direction are grouped into two groups, and at least one of the groups is connected to the lead wires via each line of the first electrically conductive units that are located at an edge of the first side of the touch-controlling layer; and/or a plurality of lines of the second electrically conductive units that are arranged in the second channel direction are grouped into two groups, and at least one of the groups is connected to the lead wires via each line of the second electrically conductive units that are located at the edge of the first side of the touch-controlling layer.

2. The touch-controlling base plate according to claim 1, wherein the non-touch-controlling region comprises two touch-controlling units, and the two touch-controlling units are individually located on the first side and a second side of the touch-controlling layer that face each other; and a plurality of lines of the first electrically conductive units that are arranged in the first channel direction are grouped into two groups, one of the groups is connected to the lead wires via each line of the first electrically conductive units that are located at the edge of the first side of the touch-controlling layer, and the other one of the groups is connected to the lead wires via each line of the first electrically conductive units that are located at an edge of the second side of the touch-controlling layer.

3. The touch-controlling base plate according to claim 1, wherein the non-touch-controlling region comprises two touch-controlling units, and the two touch-controlling units are individually located on the first side and a second side of the touch-controlling layer that face each other; and a plurality of lines of the second electrically conductive units that are arranged in the second channel direction are grouped into two groups, one of the groups is connected to the lead wires via each line of the second electrically conductive units that are located at the edge of the first side of the touch-controlling layer, and the other one of the groups is connected to the lead wires via each line of the second electrically conductive units that are located at an edge of the second side of the touch-controlling layer.

4. The touch-controlling base plate according to claim 1, wherein the touch-controlling unit is at least one touch-controlling electrode.

5. The touch-controlling base plate according to claim 1, wherein the touch-controlling region further comprises a bridging layer, the bridging layer comprises a plurality of first bridging units and a plurality of second bridging units, and the first bridging units and the second bridging units intersect with and are insulated from each other.

6. The touch-controlling base plate according to claim 5, wherein each line of the first electrically conductive units that are arranged in the first channel direction are connected to each other via the first bridging units, and each line of the second electrically conductive units that are arranged in the second channel direction are connected to each other via the second bridging units.

7. The touch-controlling base plate according to claim 6, wherein the first bridging units, the first electrically conductive units and the second electrically conductive units are arranged in a same one layer.

8. The touch-controlling base plate according to claim 7, wherein the first bridging units, the first electrically conductive units and the second electrically conductive units are fabricated by using a one-step patterning process.

9. The touch-controlling base plate according to claim 7, wherein the touch-controlling region further comprises an insulating layer, the insulating layer comprises a plurality of via holes, and the insulating layer is located between the touch-controlling layer and the second bridging units.

10. The touch-controlling base plate according to claim 7, wherein the second bridging units connect via the via holes two neighboring instances of the second electrically conductive units that are arranged in the second channel direction.

11. The touch-controlling base plate according to claim 1, wherein the first electrically conductive units and the second electrically conductive units have a same shape.

12. The touch-controlling base plate according to claim 1, wherein both of a material of the first electrically conductive units and a material of the second electrically conductive units are transparent electrically conductive materials.

13. A displaying device, wherein the displaying device comprises the touch-controlling base plate according to claim 1.

14. The displaying device according to claim 13, wherein the displaying device further comprises a display panel; and
   the touch-controlling base plate is embedded into a periphery of a base plate of the display panel, or the touch-controlling base plate is embedded into a pixel unit of the display panel.

15. The displaying device according to claim 13, wherein the displaying device includes a liquid-crystal touch-controlled displaying device or an organic-light-emitting-diode touch-controlled displaying device.

\* \* \* \* \*